United States Patent

Pischke et al.

[11] Patent Number: 5,142,897
[45] Date of Patent: Sep. 1, 1992

[54] HEIGHT ADJUSTMENT IN A VEHICLE FITTED WITH AIR SUSPENSION

[75] Inventors: Jürgen Pischke, Weissach; Engelbert Tillhon, Lauffen, both of Fed. Rep. of Germany

[73] Assignee: Robert Bosch GmbH, Stuttgart, Fed. Rep. of Germany

[21] Appl. No.: 585,163

[22] PCT Filed: Apr. 14, 1988

[86] PCT No.: PCT/EP89/00313
§ 371 Date: Oct. 15, 1990
§ 102(e) Date: Oct. 15, 1990

[87] PCT Pub. No.: WO89/09702
PCT Pub. Date: Oct. 19, 1989

[51] Int. Cl.$^5$ .................... G01D 18/00; B60G 17/015
[52] U.S. Cl. ...................... 73/1 J; 280/707; 364/571.04
[58] Field of Search ........... 73/1 J; 364/571.01, 364/571.02, 571.03, 571.04, 571.05, 571.06, 571.07, 571.08; 280/707

[56] References Cited

U.S. PATENT DOCUMENTS

| 4,575,115 | 3/1986 | Tatemoto et al. | 280/707 |
| 4,593,920 | 6/1986 | Natsume et al. | 280/707 X |
| 4,761,608 | 8/1988 | Franklin et al. | 73/1 J X |

FOREIGN PATENT DOCUMENTS

| 91017 | 10/1983 | European Pat. Off. |
| 216522 | 4/1987 | European Pat. Off. |
| 2160324 | 12/1985 | United Kingdom |

Primary Examiner—Tom Noland
Attorney, Agent, or Firm—Walter Ottesen

[57] ABSTRACT

A height sensor (20) of a height regulating device of an air spring suspension system of a vehicle is calibrated by using the air spring bellows (16) as jacks while the height regulation by the control device (44) is disabled. A dialog is set up between a test device (50) connected by an interface (52) with the control device (44), whereby the test device (50) takes over the control of the air supply to and from the air spring bellows (16) and the height of the vehicle body (10) is brought to a desired null height. The output ($h_n$) of the sensor (20) is then stored in a non-volatile memory and is used as a reference height ($h_o$) for the height regulation.

6 Claims, 1 Drawing Sheet

HEIGHT ADJUSTMENT IN A VEHICLE FITTED WITH AIR SUSPENSION

FIELD OF THE INVENTION

The invention relates to a method of calibrating a height sensor in an electronically controlled height regulating device of an air spring suspension system of a vehicle. The invention includes an apparatus for calibrating the height sensor.

BACKGROUND OF THE INVENTION

Hitherto, when calibrating the height sensor of an air spring suspension, it has been necessary first to bring the height of the vehicle body to a suitable reference height, that is to say, the desired height. This entails the use of a lifting device, such as a vehicle hoist, a lifting platform or under-frame blocks. The height sensor is then adjusted, for example, by adjusting its fixing, until it delivers the correct electrical value associated with that height. Such an expenditure and measuring technique do not lend the method to mass production techniques.

SUMMARY OF THE INVENTION

It is an object of the invention to provide a calibration method which does not require any additional mechanical appliances for it to be carried out.

This object is met by the calibration method of the invention. According to a feature of the method of the invention, the height regulating function is disabled and the air springs are controlled externally to bring the body height to a desired null position whereafter the height sensor reading ($h_n$) for this null position is programmed into the regulating device to serve as a reference value or an initial reference value for the height regulation. The air spring suspension is itself used as a mechanical jack for raising or lowering the vehicle body to a desired height at which adjustments may be made.

It is only necessary for the height sensor to be fixed in a roughly adjusted position as the final calibration can be effected purely electronically. Thus, the height sensor is secured in a roughly adjusted position after the vehicle body is brought to the desired null position and before the height sensor reading is programmed into the regulating device.

The extreme limits between which the height adjustment may be made can be established by programming the null position into the regulating device. The vehicle body is then raised by using the air springs until the air springs are fully expanded and the corresponding height sensor reading is programmed into the regulating device as a maximum height value. Also, and after programming the null position into the regulating device, the vehicle body is lowered by using the air springs until the body is resting on its stops and the corresponding height sensor reading is programmed into the regulating device as a minimum height value.

The commands for carrying out the method can be entered into the electronic control device of the height regulating device by plugging in a separate test device. Alternatively, an existing remote control can be adapted or programmed to carry out the calibration.

The invention includes apparatus for calibrating a height sensor in a height regulating device of an air spring suspension system of a vehicle.

The reference signal, or a signal from which the reference signal may be derived, is preferably stored in a non-volatile memory.

One embodiment of the apparatus comprises a test device and such a test device can be a small commercially available computer.

In another embodiment, a conventional remote control can be programmed to be used as such a test device.

BRIEF DESCRIPTION OF THE DRAWINGS

The invention is further described, by way of example, with reference to the accompanying drawing, in which.

DESCRIPTION OF THE PREFERRED EMBODIMENTS OF THE INVENTION

Figure 1:
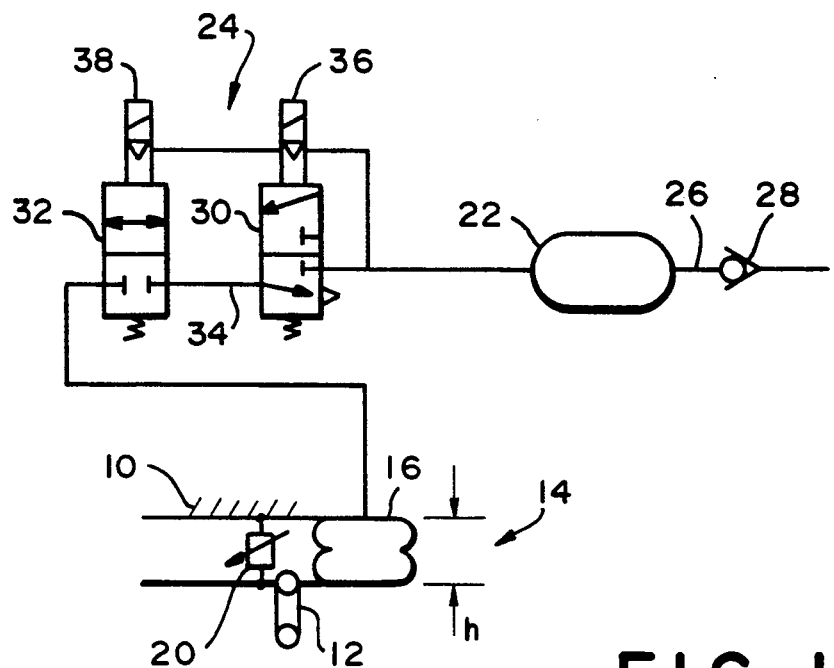
FIG. 1 is a diagram of an air suspension system for a vehicle fitted with a height regulating system.
Figure 2:
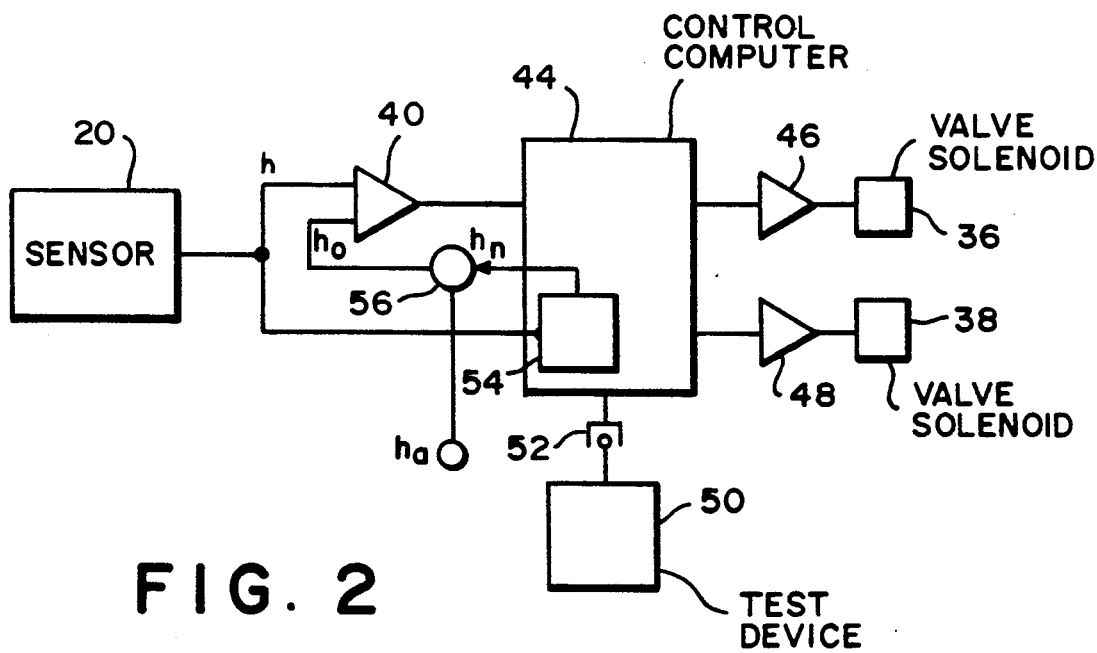
FIG. 2 is a block diagram of the height regulating system and calibrating apparatus in accordance with the invention.

FIG. 1 shows diagrammatically a part of a vehicle body 10 attached to an axle 12 by an air suspension 14. The air suspension 14 comprises an air spring bellows 16 and a height measuring sensor 20, each arranged between the vehicle body 10 and the axle 12. The height measuring sensor 20 can be a simple potentiometer or variable resistor. The air spring bellows 16 is filled and emptied as required by a compressed air reservoir 22 and a solenoid valve arrangement 24. The reservoir 22 is charged from a compressor (not shown) via a line 26 containing a non-return valve 28. The valve arrangement 24 comprises a 3-port, 2-position valve 30 and a 2-port, 2-position valve 32 in a line 34 between the reservoir 22 and the suspension bellows 16. The valves are spring-biased to their positions shown and are operated by solenoids 36,38. Actuation of both valves 30,32 connects the air spring bellows 16 to the reservoir 22 in order to feed compressed air to the air suspension 14 and thereby increase the height h of the vehicle body 10 relative to the axle 12. Actuation of the valve 32 alone connects the air spring bellows 16 via the unactuated valve 30 to exhaust and thereby decrease the height h of the vehicle body 10.

The height sensor 20 is connected to a comparator 40 whose output is connected to a computer 44. The computer controls the valve solenoids 36,38 via end stage amplifiers 46,48. The computer 44 compares the actual body height h with a desired value $h_o$ and controls energization of one or both of the solenoids 36,38, whereby, upon a deviation of the body height h from the desired value, e.g., due to a change in load, compressed air is supplied to or air is released from the air spring bellows to raise or lower the body back to the desired height.

To calibrate the sensor 20, a separate test device 50 is plugged into the control computer 44 at a serial data interface 52. The test device 50 initiates a dialog and receives a synchronzing signal of the control computer 44 and is then ready for further dialog.

By entering the command "calibration mode" into the test device 50, the regulating function of the control computer 44 is temporarily disabled and the test device 50 takes over the control of the valve solenoids 36,38. Next the vehicle body is raised or lowered by entering suitable commands into the test device 50 to adjust the height (h) of the vehicle body to a null value $h_n$ which is verified by physical measurement of the body height. Height signals from the height sensor 20 are not noted at this time. While the body is still in its null position, the sensor 20 is secured in a coarsely adjusted position. The command "calibrate" is then entered in the test device 50, whereby the sensor reading h is fed to the control computer 44 and is stored as the null value $h_n$ in a non-volatile memory 54 within the control computer 44. Thereafter, the command "end of calibration" is entered in the test device 50 and the regulating function of the control computer 44 is thereby reestablished. The null height reading $h_n$ serves as the desired height $h_o$ with the actual height h is compared by the comparator 40.

The separate test device 50 could be a conventional personal computer, a desk top computer or a briefcase computer. Alternatively, it could be constructed as a special piece of hardware. The test device 50 may have a standard interface, (for example, DIN V24 or RS 232C) by which it can be connected to the control computer 44 via a level converter.

In the case of a vehicle, such as a lorry or heavy goods vehicle, fitted with a remote control by means of which the normal height of the vehicle body can be steplessly adjusted, there is the possibility of carrying out the calibration method of the invention without any additional hardware. A diagnosis switch can be operated to enter the calibration functions into the remote control. A feedback of the actual height of the vehicle body can be obtained by pilot lamps already fitted to the vehicle, such as "normal height lamp", "fault lamp".

We claim:

1. A method of calibrating a height sensor in an electronically controlled height regulating device of a multiple air spring suspension system of a vehicle, the method comprising the steps of:

disabling the height regulating function and externally controlling the air springs to bring the body height to a desired null position; and, then programming said null position into the regulating device to serve as a reference value for the height regulation.

2. The method of claim 1, wherein the height sensor is secured in a roughly adjusted position after the vehicle body is brought to the desired null position and before the height sensor reading is programmed into the regulating device.

3. The method of claim 1, wherein, after the null position is programmed into the regulating device, the vehicle body is raised by using the air springs until the air springs are fully expanded and the corresponding height sensor reading is programmed into the regulating device as a maximum height value.

4. The method of claim 1, wherein, after the null position is programmed into the regulating device, the vehicle body is lowered by using the air springs until the body is resting on stops thereof and the corresponding height sensor reading is programmed into the regulating device as a minimum height value.

5. The method of claim 1, wherein an external test device is plugged into a serial data interface, with which the height regulating device is provided, and an external computer is used to control the air springs and to enter the height sensor reading or readings into the regulating device.

6. The method of claim 1, wherein the vehicle is fitted with a remote control for the adjustment of the body height and the remote control is programmed to carry out the calibration function.

* * * * *

UNITED STATES PATENT AND TRADEMARK OFFICE
CERTIFICATE OF CORRECTION

PATENT NO. : 5,142,897
DATED : September 1, 1992
INVENTOR(S) : Jürgen Pischke and Engelbert Tillhon It is certified that error appears in the above-identified patent and that said Letters Patent is hereby corrected as shown below:

On the title page, item [86]: delete "PCT/EP89/00313" and substitute -- PCT/EP88/00313 -- therefor.

In column 3, line 11: between "with" and "the", insert -- which --.

Signed and Sealed this

Ninth Day of November, 1993

Attest:

BRUCE LEHMAN

Attesting Officer

Commissioner of Patents and Trademarks